United States Patent [19]
Pole et al.

[11] 4,076,372
[45] Feb. 28, 1978

[54] TWO-DIMENSIONAL LIGHT DEFLECTOR APPARATUS

[75] Inventors: Robert Vladimir Pole, Los Gatos, Calif.; Hans Peter Wollenmann, Rueti, Switzerland

[73] Assignee: International Business Machines Corporation, Armonk, N.Y.

[21] Appl. No.: 791,821

[22] Filed: Apr. 28, 1977

Related U.S. Application Data

[63] Continuation of Ser. No. 643,891, Dec. 23, 1975, abandoned.

[51] Int. Cl.² ............................................. G02B 27/17
[52] U.S. Cl. .................................. 350/6.9; 350/3.71; 358/225
[58] Field of Search ................. 350/6, 3.5, 7, 162 ZP, 350/162 R, 160 P; 340/173 L, 173 S, 178, 6.8; 358/199

[56] References Cited

U.S. PATENT DOCUMENTS

| | | | |
|---|---|---|---|
| 1,962,474 | 6/1934 | Baird | 350/162 ZP |
| 3,940,202 | 2/1976 | Kato et al. | 350/162 R |
| 3,951,509 | 4/1976 | Noguchi | 350/7 |
| 3,953,105 | 4/1976 | Ih | 350/7 |

*Primary Examiner*—John K. Corbin
*Assistant Examiner*—B. W. delos Reyes
*Attorney, Agent, or Firm*—Otto Schmid, Jr.

[57] ABSTRACT

A two-dimensional light deflector is shown which comprises a cylindrical member having a plurality of holograms recorded thereon. A collimated light beam is directed to illuminate the hologram cylinder and rotation of the hologram cylinder provides a line scan which is at an angle of about 45° with respect to the plane of rotation of the cylinder. The azimuthal position of the line scan can be varied by the rotation of a small mirror which directs the illumination beam. As a consequence, a two-dimensional raster scan on a cylindrical image surface is produced.

14 Claims, 7 Drawing Figures

TWO-DIMENSIONAL LIGHT DEFLECTOR APPARATUS

This is a continuation of application Ser. No. 643,891 filed Dec. 23, 1975, now abandoned.

BACKGROUND OF THE INVENTION

This invention relates to light beam scanning apparatus and more particularly to light beam scanning apparatus utilizing rotating holograms.

There exists a need for a scanner apparatus operable so that a light beam can be scanned in a line-by-line fashion over a given area. Generally, the prior art scanners have been capable of scanning in one dimension at a relatively fast scanning rate. However, the scan for the second dimension is at a relatively slow scanning rate. For example, one prior art scanner utilizes a rotating mirror to provide a relatively fast scan in one dimension. An oscillating mirror is positioned to locate the scan lines in a direction perpendicular to the fast scan direction and this scan is at a relatively slow rate. Attempts to improve these scanners have resulted in more complex arrangements and, in some cases, there is a requirement for synchronization between two or more components of the scanning system.

It is therefore the principal object of this invention to provide improved apparatus for scanning a light beam over a given two-dimensional area.

SUMMARY OF THE INVENTION

Briefly, according to the invention, the scanning apparatus comprises a cylindrical member having a plurality of holograms recorded on its surface, optical means for producing a collimated light beam and for directing the beam to illuminate a small area of the hologram to produce a point on an image surface. Drive means are provided to rotate the cylindrical member about its axis to form a line scan on the image surface and drive means are provided to rotate the beam directing means about the axis of the cylindrical member so that the reconstructed beam can produce a two-dimensional raster scan of the image surface.

DETAILED DESCRIPTION OF THE PREFERRED EMBODIMENT

Figure 3:
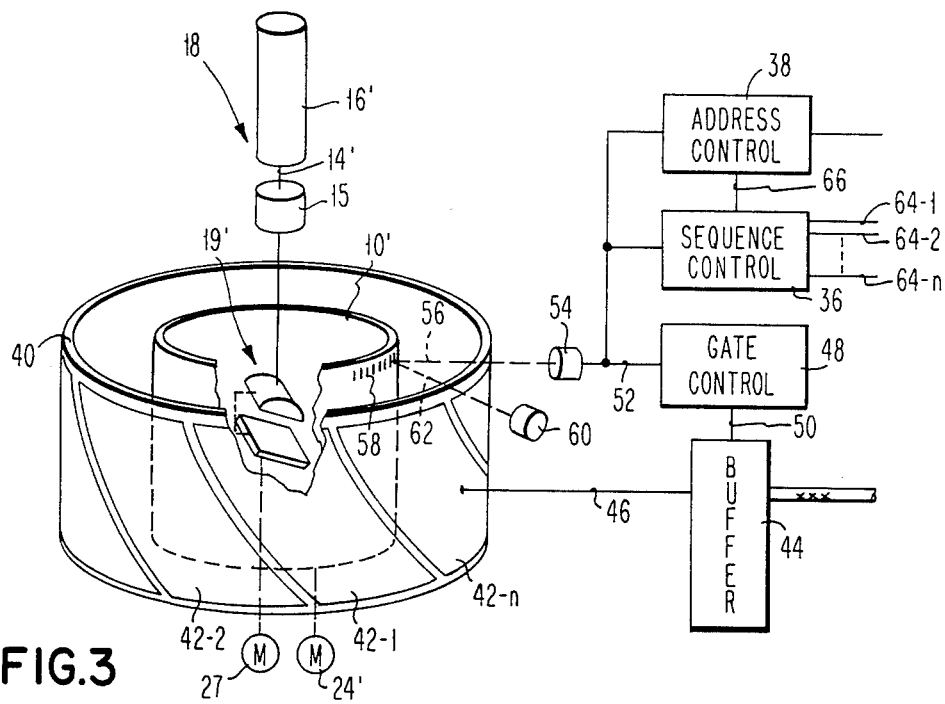
FIG. 3 is a schematic view of a recording system utilizing the light beam scanner shown in FIGS. 1 and 2.
Figure 1:
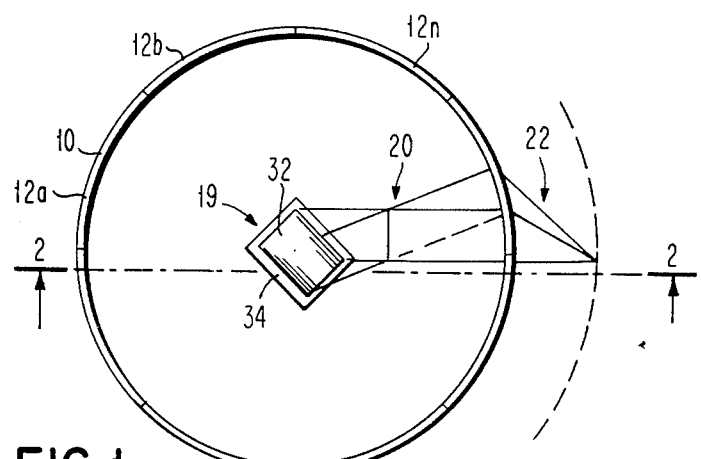
FIG. 1 is a diagrammatic schematic view of the scanning apparatus embodying the invention.

Referring to FIG. 1, the light beam scanner comprises a holographic cylindrical member 10 having a plurality of holograms 12a, 12b ... 12n recorded on its surface. Optical means 18 is provided to produce a beam of light and direct the beam to impinge on holographic member 10 to produce a reconstructed beam. Optical means 18 comprises a laser 16 which emits a collimated light beam 14. Beam 14 impinges on beam configuring and deflecting means 19 which directs the divergent light beam 20 to impinge on holographic member 10 to produce a reconstructed convergent beam 22. Drive means such as motor 24 is connected by a suitable mechanical coupling 23 (shown dotted in the drawing) to holographic member 10 to rotate it about the axis of the cylinder 10, thereby causing the beam 20 to illuminate successive holograms 12. This action causes the reconstructed beam 22 to provide a line scan at an angle to the plane of rotation of the hologram cylinder 10. Drive means such as motor 24 is also connected by a suitable mechanical coupling 25 (shown dotted in the drawing) to optical means 18 to rotate it about the axis of hologram cylinder 10. A separate motor such as a stepping motor drive, may be provided to drive optical means 18, if desired. This action causes the reconstructed beam 22 to be generated at a different azimuthal position and, due to the rotation of optical means 18, each point on an image cylinder is reached in a short time.

The holographic cylindrical member 10 comprises suitable radial support member 26 mounted to support transparent cylindrical member 28. Member 28 preferably comprises a glass cylinder having a suitable photopolymer deposited on its inner surface. However, the photopolymer could as well be deposited on the outer surface of the glass cylinder, if desired. The cylinder has a number of holograms recorded thereon by techniques known in the art. These holograms are volume phase holograms so that a high holographic efficiency is obtained and the number $n$ of holograms recorded is chosen based on the speed of rotation of member 10 and the required number of scanning lines. In typical applications, member 10 is rotated at a high speed such as 12,000 RPM.

Figure 4:
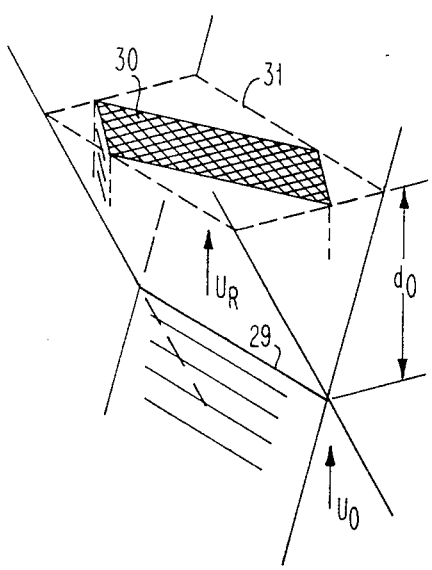
FIG. 4 is a diagram showing the geometry illustrating a plane hologram formation.
Figure 5:
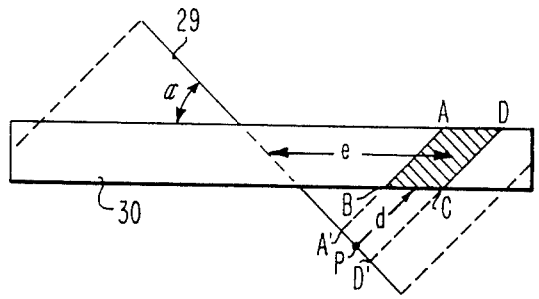
FIG. 5 is a diagram showing the geometry relating to the reconstruction of the focal line of the hologram formed in FIG. 4.
Figure 6A:
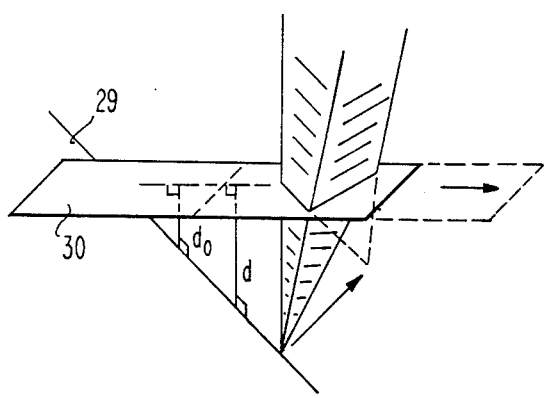
FIG. 6A and FIG. 6B is a diagram showing reconstruction of a point and deflection of the reconstructed point for a hologram formed in FIG. 4.
Figure 6B:
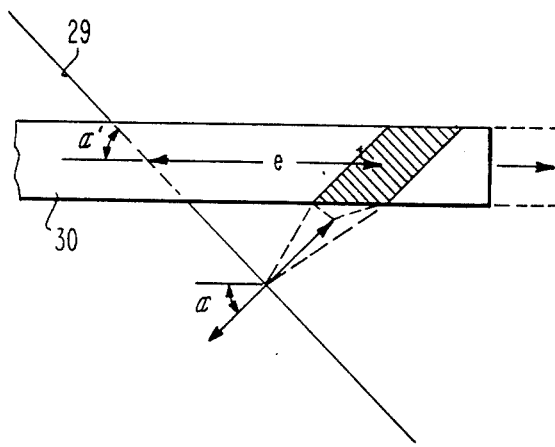

The principle of operation of the scanner can be better understood by referring to the diagrams shown in FIGS. 4, 5 and 6. A rectangular photosensitive plate is subjected to the interference pattern of a cylindrical wave as an object wave and an essentially plane wave as a reference wave to form a hologram 30 as shown in FIG. 4. The focal line of the cylindrical wave lies in a parallel plane at a distance $d_o$ from the hologram plane 31 and makes an angle $a'$ with the longitudinal direction of the hologram 30 as shown in FIG. 5. Illuminating the entire hologram 30 with the conjugate reference wave reconstructs the whole focal line 29. However, illuminating only a part of the hologram 30 (such as area ABCD in FIG. 5) reconstructs the corresponding part (A'D') of the focal line.

Illuminating a part of a hologram 30 (such as area ABCD of FIG. 5) with a cylindrically convergent reference wave having a focal line perpendicular to the focal line of hologram 30 compresses the portion A'D' of the focal line to a reconstructed point P. The correcting term applied to the plane reference wave at the hologram formation compensates the increasing distance $d$ (see FIG. 6a) of the focal line from the center of subsequent areas ABCD, making it possible to apply in the reconstruction of a point the same convergent reference wave for all portions of the hologram.

Having the cylindrically convergent reference beam fixed and moving the hologram 30 along its longitudinal axis, as shown in two views in FIGS. 6a, b, deflects the reconstructed point perpendicular to the focal line of the hologram. A repeated deflection of the beam is achieved if a series of holograms is recorded.

The same principal described above for a plane hologram can be applied to a hologram of cylindrical shape. The reference wave in this case has to be essentially rotationally invariant with respect to the center of curvature of the hologram cylinder. If the hologram is illuminated by such a reference wave (e.g., a spherical or cylindrical divergent wave emerging from the axis of the hologram cylinder) then a convergent cylindrical wave is reconstructed, its focal line making an angle α between 0° and 90°, preferably about 45°, with respect to the plane containing the base of the cylindrical member. The angle of 45° is preferred since this angle produces the longest scan line and therefore the greatest resolution. Illuminating only a portion of the hologram with a similar (but in the direction of the focal line) convergent wave reconstructs a point. Rotating the hologram cylinder with its axis of curvature as its axis of rotation deflects the reconstructed point perpendicular to the focal line.

A beam deflector in two dimensions consists of several cylindrical holograms as described above recorded all around a transparent ring. The reference wave from laser 16, incident along the axis of rotation as a plane wave, is formed by means of beam configuring and deflecting means 19 which functions to form the beam into a cylindrically divergent beam 20 directed toward the hologram ring 10. Cylindrically divergent beam 20 is shaped to illuminate a small portion of the hologram and this illumination reconstructs a small segment of the original line image. This reconstructed beam has more convergence in the direction of the line image so as to converge the reconstructed line segment to a point. Thus, it can be seen that the reconstruction of a point is actually a two-step process in which the two steps occur simultaneously. In the embodiment shown, beam configuring and deflecting means 19 comprises a cylindrical lens 32 and a small mirror 34. Beam configuring and deflecting means 19 is rotated about the same axis as hologram cylinder 10. By rotating the hologram ring at constant high speed, the reconstructed point is deflected continuously along a line on an outer image cylinder. Due to the fact that optical means 18 is small, it can be accelerated fast, making it possible to reach each point of the image cylinder in a short time.

Figure 2:
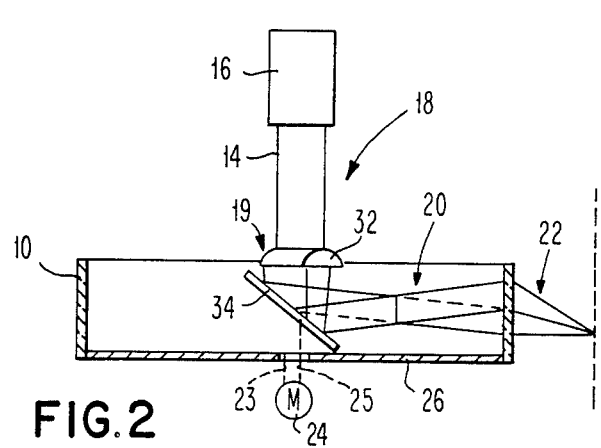
FIG. 2 is a diagrammatic section view along lines 2—2 of the scanning apparatus shown in FIG. 1.

A storage device embodying our holographic light deflector is shown in FIG. 2. The storage device comprises a light beam deflector positioned to scan storage member 40. Storage member 40 is arranged in cylindrical fashion and positioned to be coincident with the image cylinder surface scanned by the light deflector apparatus. The data to be accessed by the scanner is recorded on storage member 40 as coded representations of data by any suitable means. Storage member 40 is made from any suitable optical data storage material and the choice of material depends on the type of recording chosen. For example, if the recording is read-only recording, the material may be a photographic film. To produce a read-write storage device a magneto-optical material may be used, for example. A plurality of sensing devices 42-1, 42-2 . . . 42-n are radially disposed adjacent to storage member 40. Sensing devices 42 may comprise any suitable devices such as a photosensitive device for a read-only storage and a device incorporating suitable analyzers and polarizers for the example in which magneto-optic techniques are used, for example. Outputs from the various sensing devices are interconnected to individual readout buffers 44. To avoid confusion in the drawing, only a single buffer 44 and interconnections 46 are shown. Electrical patterns of the stored information are read out through these lines 46 and stored in the readout buffer 44 from which the information is read to some form of utilization device under control of a gate control means 48 interconnected by way of line 50 to the buffer 44. The gate control means 48 is interconnected by way of line 52 to a photodiode 54 which receives light pulses of reflected light along a path 56 from timing track 58 which has an alternate arrangement of reflecting and nonreflecting surfaces. Light from source 60 is projected by way of a light path 62 to the timing track 58 from which pulses of light are reflected to the photodiode 54. The latter changes the light pulses to electrical pulses. On a readout operation the holographic cylinder member 10' is rotated by drive motor 24' by a drive connection such as belts or gears, shown dotted in the drawing. Beam configuring and deflecting means 19' are driven by a suitable motor 27 such as a stepping motor, through a suitable mechanical coupling shown dotted in the drawing. The stepping motor can be controlled to provide either continuous or stepping drive as is known in the art. A suitable modulator 15 is provided to selectively modulate beam 14' from laser 16'. By the use of the drive provided by motor 27 and the control provided by modulator 15, random access to all data from storage member 40 is provided. During a cycle of rotation, of beam configuring and deflecting means 19' and many rotations of the cylindrical member 10', light from laser source 16 is directed to every point on the storage member 40 and information is detected by the appropriate devices 42. Selective readout control is further achieved by way of lines 64-1, 64-2, 64-3 . . . 64-n to a sequence control unit 36 which is in turn connected by way of a line 66 to an address control means 38. Under control of the latter, different sequences and combinations of sensing devices 42 can be selected to read out any desired combination of stored words of information. The address control means 28 can address a certain line or word of storage and the sequence control unit 36 is utilized to control modulator 15 to achieve readout of the desired bits within that line or word.

While the invention has been particularly shown and described with reference to a preferred embodiment thereof, it will be understood by those skilled in the art that various changes in the form and details may be made therein without departing from the spirit and scope of the invention.

What is claimed is:

1. A holographic light deflector apparatus comprising:
   a cylindrical member having a plurality of holograms recorded on a surface thereof, each of said holograms when reconstructed producing a line image on a cylindrical image surface, with each line being at an angle with respect to the plane containing the base of said cylindrical member;
   optical means for producing and directing a beam of light toward said cylindrical member, said beam of light being shaped to illuminate a small area of said holograms and being shaped to produce more convergence in the direction of said line image so as to reconstruct a point image;
   means for rotating said cylindrical member about its axis at a constant high speed so that the resulting reconstructed point image is deflected in a direction perpendicular to said line image; and means for rotating said optical means about the axis of said cylindrical member so that said reconstructed image point is capable of scanning the entire cylindrical image surface.

2. The light deflector apparatus of claim 1 wherein said optical means comprises a light source for providing a beam of light, a beam configuring means and a reflecting means.

3. The light deflector apparatus of claim 2 wherein said light source for providing a beam of light comprises a coherent laser source.

4. The light deflector apparatus of claim 2 wherein said beam configuring means comprises a cylindrical lens.

5. The light deflector apparatus of claim 2 wherein said reflecting means comprises a mirror mounted for rotation about the axis of the cylindrical member.

6. A storage apparatus comprising:
a cylindrical scanner member having a plurality of holograms recorded on a surface thereof, each of said holograms when reconstructed producing a line image on a cylindrical image surface, with each line being at an angle with respect to the plane containing the base of said cylindrical member;
a cylindrical record member having data recorded thereon mounted concentric with said cylindrical scanner member;
optical means for producing and directing a beam a light toward said cylindrical scanner member, said beam of light being shaped to illuminate a small area of said holograms and being shaped to produce more convergence in the direction of said line image so as to reconstruct a point image;
means for rotating said cylindrical scanner member about its axis at a constant high speed so that the resulting reconstructed point image is deflected in a direction perpendicular to said line image;
means for rotating said optical means about the axis of said cylindrical scanner member so that said reconstructed image point is capable of scanning the entire cylindrical record member; and
means for sensing the data from a predetermined area of said record member.

7. The storage apparatus of claim 6 wherein said optical means comprises a light source for providing a beam of light, a beam configuring means and a reflecting means.

8. The storage apparatus of claim 7 wherein said light source for providing a beam of light comprises a coherent laser source.

9. The scanner apparatus of claim 7 wherein said beam configuring means comprises a cylindrical lens.

10. The scanner apparatus of claim 7 wherein said reflecting means comprises a mirror mounted for rotation about the axis of the cylindrical member.

11. The storage apparatus of claim 8 wherein said light source for providing a beam of light includes light modulator means for modulating the light beam incident to said optical means.

12. The storage apparatus of claim 11 wherein said modulator means modulates the light beam intensity.

13. A holographic light deflector apparatus comprising:
a cylindrical member having a plurality of holograms recorded on a surface thereof, each of said holograms when reconstructed producing a line image on a cylindrical image surface, with each line being at an angle with respect to the plane containing the base of said cylindrical member;
optical means for producing and directing a beam of light toward said cylindrical member, said beam of light being shaped to illuminate a small area of said holograms and being shaped to produce more convergence in the direction of said line image so as to reconstruct a point image;
means for rotating said cylindrical member about its axis at a constant high speed to expose first successive small areas of said holograms to said beam of light so that the resulting reconstructed point image is deflected in a direction perpendicular to said line image and produces a first line image on said cylindrical image surface; and
means for selectively moving said optical means to cause said beam of light to expose additional small areas of said holograms adjacent said first areas so that said reconstructed image point provides additional line images on said cylindrical image surface for each position of said optical means whereby the entire cylindrical image surface can be scanned.

14. A storage apparatus comprising:
a cylindrical scanner member having a plurality of holograms recorded on a surface thereof, each of said holograms when reconstructed producing a line image on a cylindrical image surface, with each line being at an angle with respect to the plane containing the base of said cylindrical member;
a cylindrical record member having data recorded thereon mounted concentric with said cylindrical scanner member;
optical means for producing and directing a beam of light toward said cylindrical scanner member, said beam of light being shaped to illuminate a small area of said holograms and being shaped to produce more convergence in the direction of said line image so as to reconstruct a point image;
means for rotating said cylindrical scanner member about its axis at a constant high speed to expose first successive small areas of said holograms to said beam of light so that the resulting reconstructed point of image is deflected in a direction perpendicular to said line image and produces a first line image on said cylindrical record member; and
means for selectively moving said optical means to cause said beam of light to expose additional small areas of said holograms adjacent said first areas to that said reconstructed image point provides additional line images on said cylindrical record member for each position of said optical means whereby the entire cylindrical record member can be scanned.

* * * * *